(12) United States Patent
Buresh

(10) Patent No.: US 7,699,369 B1
(45) Date of Patent: Apr. 20, 2010

(54) HOOD SCOOP DECORATION KIT

(76) Inventor: Theodore Allen Buresh, W14364 Lyngen Rd., Blair, WI (US) 54616

( * ) Notice: Subject to any disclaimer, the term of this patent is extended or adjusted under 35 U.S.C. 154(b) by 0 days.

(21) Appl. No.: 12/288,544

(22) Filed: Oct. 20, 2008

Related U.S. Application Data

(60) Provisional application No. 61/000,079, filed on Oct. 22, 2007.

(51) Int. Cl.
*B60J 9/00* (2006.01)
(52) U.S. Cl. .................. 296/1.07; 296/193.12
(58) Field of Classification Search ............. 296/1.07, 296/1.08, 193.12
See application file for complete search history.

(56) References Cited

U.S. PATENT DOCUMENTS

D528,482 S * 9/2006 Hamburger ............... D12/181
2009/0049987 A1* 2/2009 Fiello ............................ 95/284

* cited by examiner

*Primary Examiner*—Lori L Lyjak
(74) *Attorney, Agent, or Firm*—Tipton L. Randall

(57) ABSTRACT

A hood scoop decoration kit includes a bezel trim member having a concave shape with first and second ends extending in a common direction from a center section thereof. The bezel trim member is attached to an exterior surface of a hood scoop adjacent a forward facing end thereof. A planar mesh member, having a trapezoidal shape, is attached to a forward facing end of a hood scoop. The kit includes an attachment device for securing the bezel trim and planar mesh members to the hood scoop. In one embodiment, an adhesive material is applied to the concave surface of the bezel trim member and to an edge of the mesh member to provide attachment of these members to the hood scoop. The adhesive material includes a fluid adhesive and/or a tape having opposed adhesive sides. Alternatively, mechanical fasteners are employed for securing the decorative members to the hood scoop.

20 Claims, 6 Drawing Sheets

HOOD SCOOP DECORATION KIT

CROSS-REFERENCE TO RELATED APPLICATIONS, IF ANY

This application claims the benefit under 35 U.S.C. §119(e) of provisional application Ser. No. 61/000,079, filed 22 Oct. 2007. Application Ser. No. 61/000,079 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a hood scoop decoration kit and, more particularly, to a hood scoop decoration kit adapted for use by an individual and, most particularly, to a hood scoop decoration kit that provides all materials for attaching the decorative items to the various surfaces of a simulated automotive hood scoop.

2. Background Information

It is common for high performance or sporty passenger vehicles to have an air intake scoop in the center of the hood to provide additional air to the intake of the engine. This feature is commonly referred to as a hood scoop. The hood scoop extends above the vehicle hood and has a forward facing, open, front end that provides intake of air. A screen or mesh is routinely attached within the open front end to prevent debris from being carried into the engine. The body of the hood scoop tapers to a rearward end that merges into the vehicle hood.

To further enhance the appearance of a vehicle which is not fitted with a hood scoop, a number of simulated hood scoops are available for purchase and installation on the vehicle hood. The simulated hood scoops are often fabricated from plastic polymer and fiberglass, and painted to match the color of the vehicle. The simulated hood scoops are often rather plain, and the owner of the vehicle may wish to further enhance the appearance with various decorative features.

Applicant has invented a hood scoop decorative kit to meet this need. The kit allows an individual to dress up a simulated hood scoop, or an actual hood scoop, at a reasonable cost.

SUMMARY OF THE INVENTION

The invention is directed to a hood scoop decoration kit, which includes a bezel trim member having a concave shape with first and second ends extending in a common direction from a center section thereof. The bezel trim member is adapted for attachment to an exterior surface of a hood scoop adjacent a forward facing end thereof. A planar mesh member, having a trapezoidal shape, is adapted for attachment to a forward facing end of a hood scoop. The kit also includes an attachment device for securing the bezel trim member and the planar mesh member to the hood scoop. In one embodiment, an adhesive material is adapted for application to the concave surface of the bezel trim member and to an edge of the planar mesh member to provide attachment of the bezel trim and mesh members to the hood scoop. The adhesive material includes a fluid adhesive and/or a tape having opposed adhesive sides. Alternatively, mechanical fasteners are employed for securing the bezel trim and mesh members to the hood scoop.

In a further embodiment of the invention, the hood scoop decoration kit includes a cleaning material adapted for preparing the selected mounting surface of the hood scoop for attachment of the bezel and mesh members thereto.

DESCRIPTION OF THE EMBODIMENTS

Nomenclature

10 Hood Scoop Decoration Kit
20 Concave Bezel Trim Member
22 First End of Bezel Trim Member
24 Second End of Bezel Trim Member
26 Center Section of Bezel Trim Member
30 Planar Mesh Member
40 Attachment Device for Bezel Trim Member and Mesh Member
50 Adhesive Material
55 Double Surface Tape
60a First Side of Tape
60b Second Side of Tape
65 Removable Film
70 Contained Fluid Adhesive
75 Air-Tight Container for Adhesive
80 Mechanical Fastener Members
90 Cleaner Material
95 Cleaning Fluid
99 Container for Cleaning Fluid
H Hood Scoop of Motor Vehicle

Construction

The invention is a hood scoop decoration kit, which includes a bezel trim member having a concave shape with first and second ends extending in a common direction from a center section thereof. The bezel trim member is adapted for attachment to an exterior surface of a hood scoop adjacent a forward facing end thereof. A planar mesh member, having a trapezoidal shape, is adapted for attachment to a forward facing end of a hood scoop. The kit also includes an attachment device for securing the bezel trim member and the planar mesh member to the hood scoop. In one embodiment, an adhesive material is adapted for application to the concave surface of the bezel trim member and to an edge of the planar mesh member to provide attachment of the bezel trim and mesh members to the hood scoop. The adhesive material includes a fluid adhesive and/or a tape having opposed adhesive sides. Alternatively, mechanical fasteners are employed for securing the bezel trim and mesh members to the hood scoop.

In a further embodiment of the invention, the hood scoop decoration kit includes a cleaning material adapted for preparing the selected mounting surface of the hood scoop for attachment of the bezel and mesh members thereto.

Figure 1:
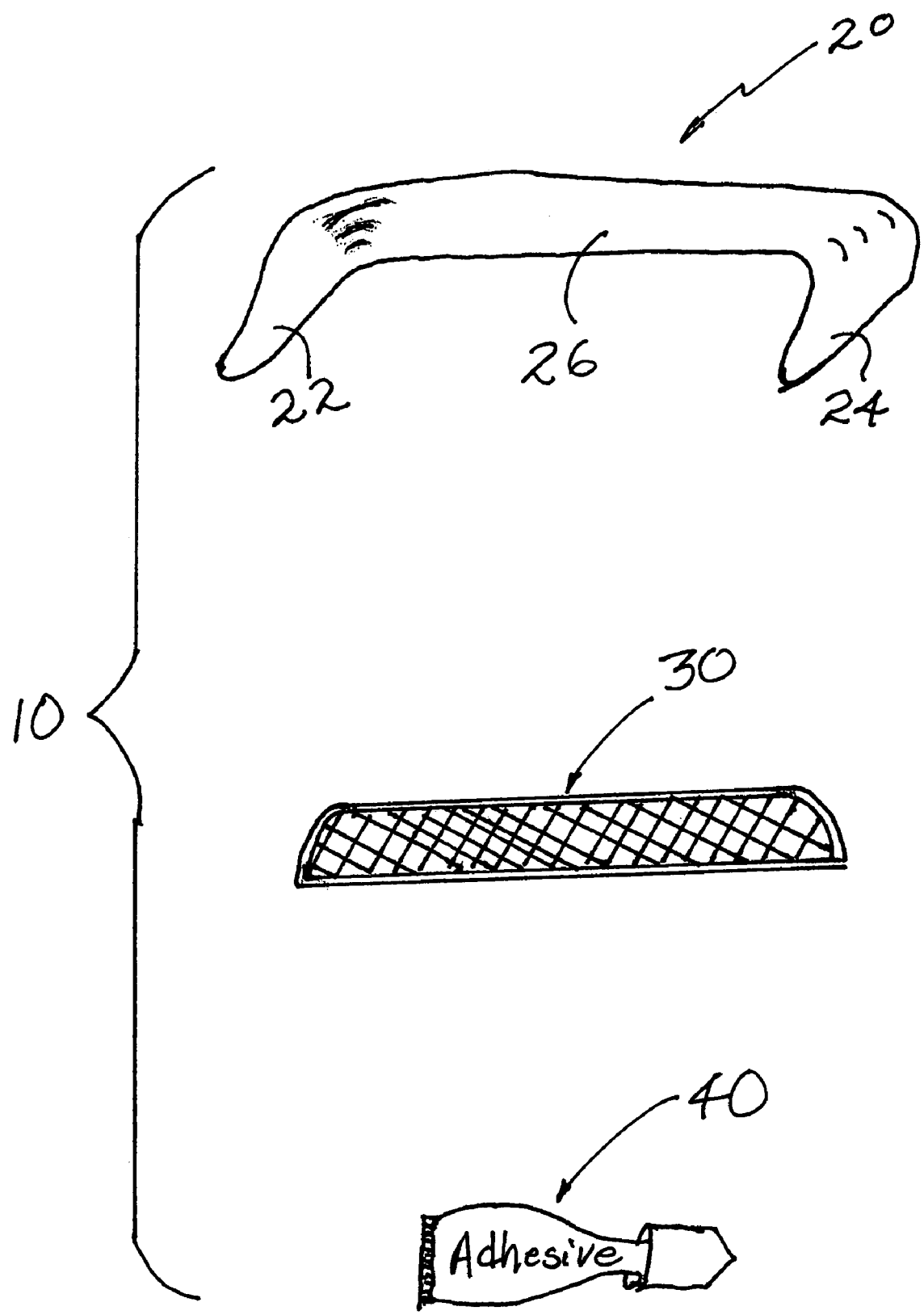
FIG. 1 is a representation of one embodiment of the hood scoop decoration kit of the present invention.
Figure 2:
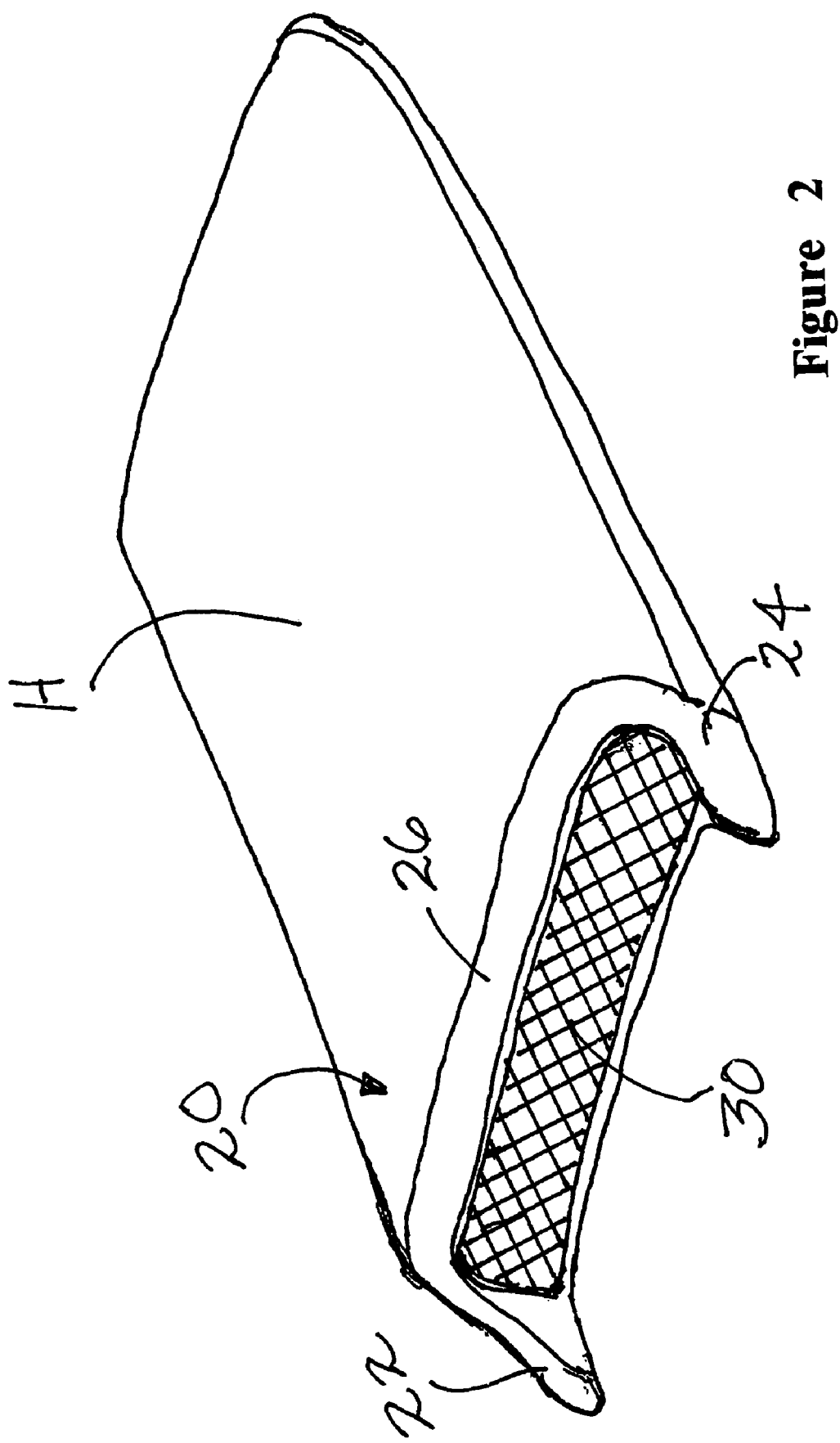
FIG. 2 is a perspective view of a hood scoop fitted with the bezel trim member and mesh member of the hood scoop decoration kit of the present invention.

Referring now to FIG. 1, one embodiment of the hood scoop decoration kit 10 is illustrated. The hood scoop decoration kit 10 includes a bezel trim member 20 having a concave shape with a first end 22 and a second end 24 extending in a common direction from a center section 26 thereof. The bezel trim member 20 is adapted for attachment to an exterior surface of a hood scoop H adjacent a forward facing end of the hood scoop. A hood scoop H is shown in FIG. 2 with the bezel trim member 20 of FIG. 1 attached. The bezel trim member 20 is contoured to conform to the shape of the hood scoop H along the outer edge, adjacent the forward facing opening thereof.

A planar mesh member 30, having a trapezoidal shape, is adapted for attachment to a forward facing end of a hood scoop H. FIG. 2 shows the planar mesh member 30 of FIG. 1 attached to the hood scoop H. The planar mesh member 30 is sized to fit snugly against the forward facing end of the hood scoop H. The bezel trim member 20 and the planar mesh member 30 may be fabricated from a metallic material or a polymeric resin material. Preferably, the bezel trim member 20 and the planar mesh member 30 are fabricated from formed or stamped sheet metal with a preferred thickness of 0.040 to 0.063 inches, providing some flexibility for these components. Most preferably, the bezel trim member 20 and the planar mesh member 30 are fabricated from a ferrous alloy or aluminum, and are chrome plated for additional decorative appearance.

Figure 3:
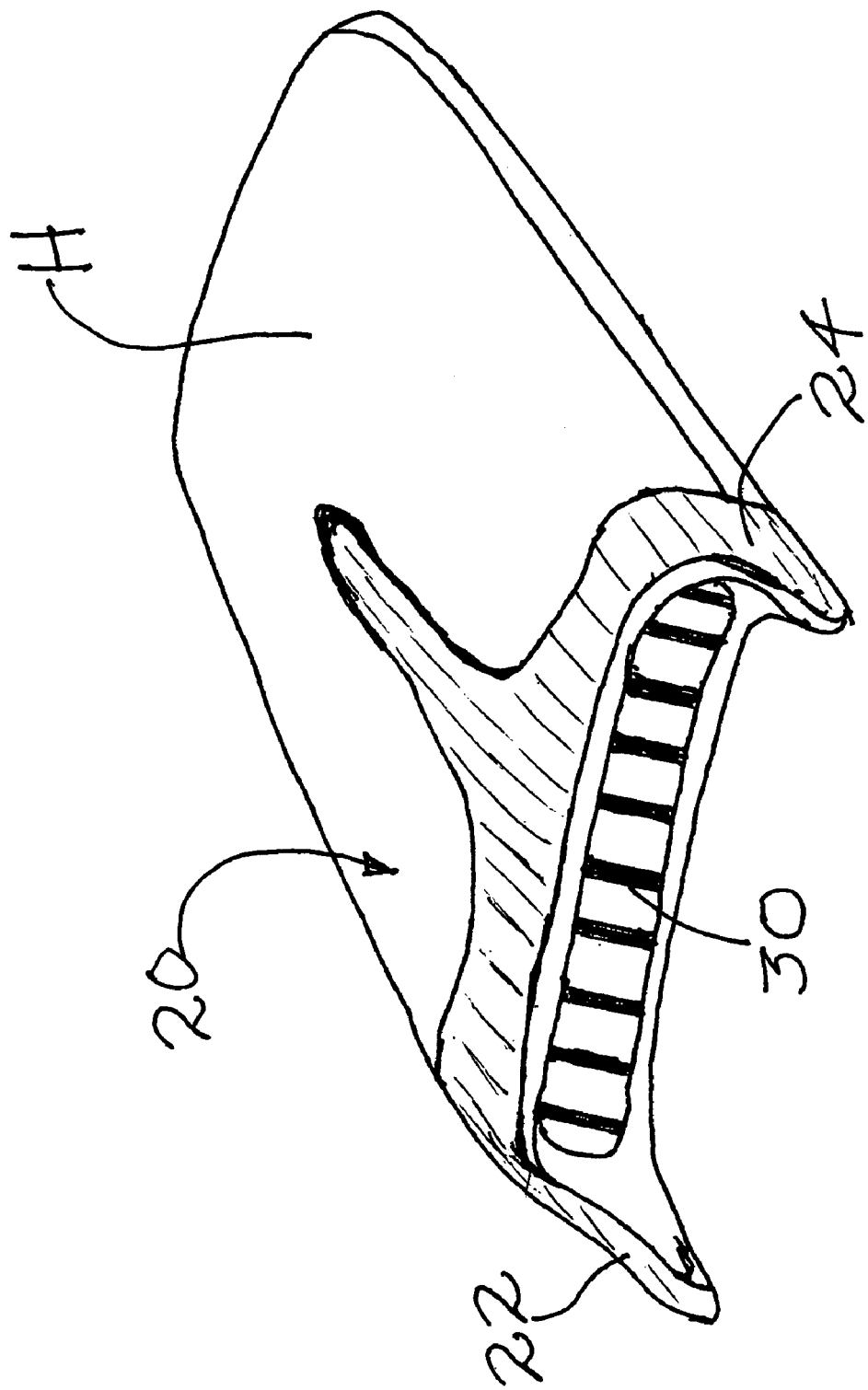
FIG. 3 is a perspective view of a hood scoop fitted with another bezel trim member and another mesh member of the hood scoop decoration kit of the present invention.

The kit 10 also includes an attachment device 40 for securing the bezel trim member 20 and the planar mesh member 30 to the hood scoop H. In one embodiment, an adhesive material 40 is adapted for application to the concave surface of the bezel trim member 20 and to an edge of the mesh member 30 to provide attachment of the bezel trim member 20 and mesh member 30 to the hood scoop H, as illustrated in FIG. 2. The bezel trim member 20 and mash member 30 can vary in their outward appearance. Two alternative designs for the bezel trim member 20 and mesh member 30 mounted to a hood scoop H are shown in FIG. 3. For example, the design of the planar mesh member 30 is chosen to match the grill design of the vehicle fitted with the simulated hood scoop H.

Figure 4:
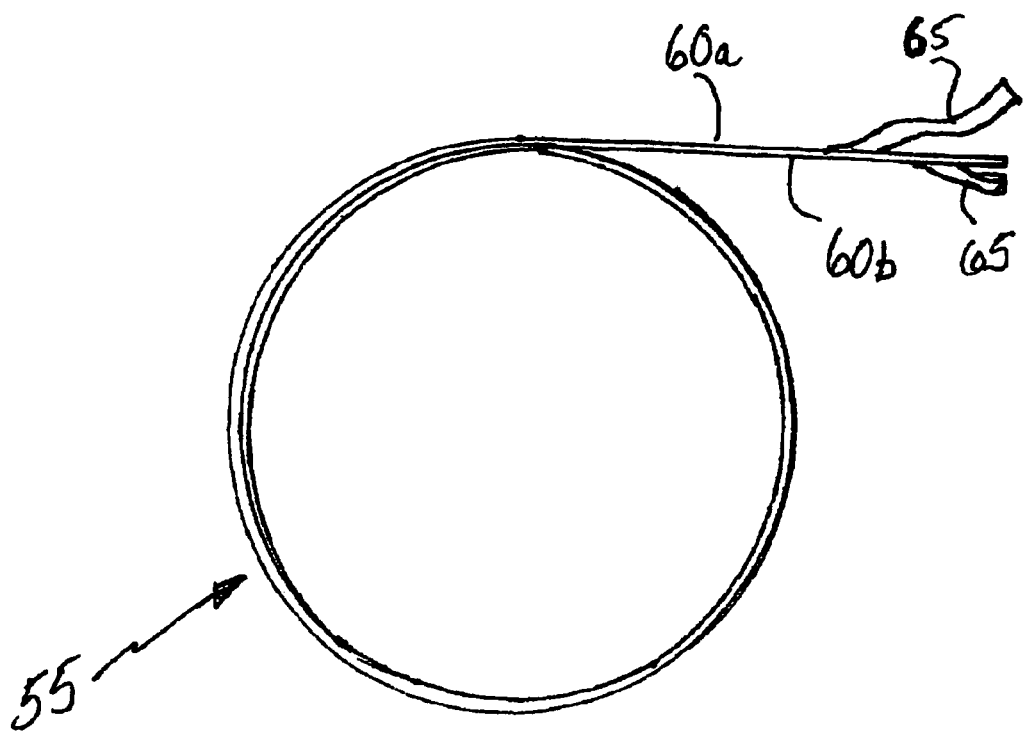
FIG. 4 is a perspective view of one embodiment of the adhesive material of the hood scoop decoration kit of the present invention.

The adhesive material 40 includes a fluid adhesive 50, such as "super glue" (FIGS. 1 and 5) and/or a tape material 55 having opposed adhesive sides 60a, 60b, each side covered by a removable film 65, as illustrated in FIG. 4. Alternatively, mechanical fasteners, such as threaded fasteners or rivets, are employed for securing the bezel trim member 20 and mesh member 30 to the hood scoop H.

Figure 6:
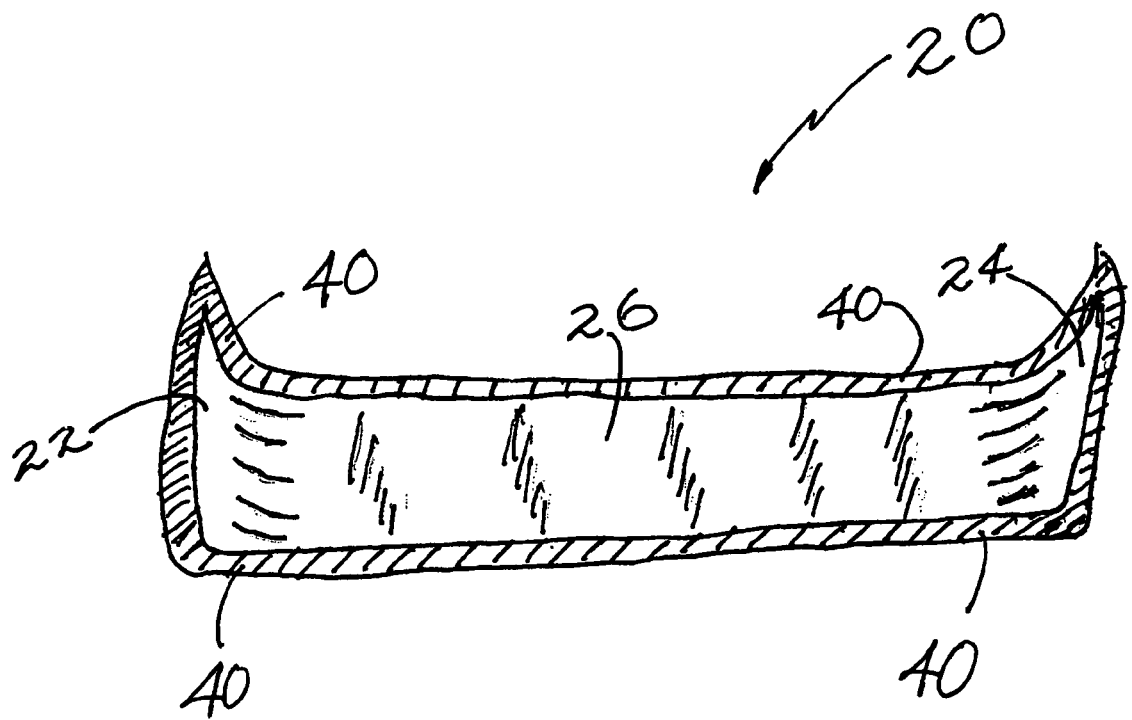
FIG. 6 is a bottom view of one embodiment of the bezel trim member with the attachment device of the hood scoop decoration kit of the present invention.
Figure 7:
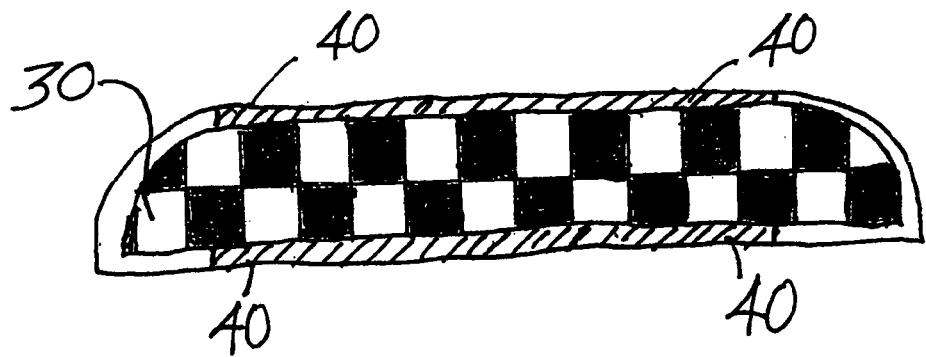
FIG. 7 is a rear view of one embodiment of the mesh member with the attachment device of the hood scoop decoration kit of the present invention.

In one embodiment of the hood scoop decoration kit 10 invention, the adhesive material 50 comprises a double-sided tape 55 having opposed adhesive surfaces 60a and 60b. The tape 55, illustrated in FIG. 4, can be supplied separately in the kit 10, with each adhesive surface 60a and 60b covered with a removable film 65. Alternatively, one adhesive surface 60a of a portion of the double-sided tape 55 is adhered to the concave side of the bezel trim members 20 and the other adhesive surface 60b covered with a removable film 65, as illustrated in FIG. 6. Similarly, one adhesive surface 60a of a portion of the double-sided tape 55 is adhered to the back side of the planar mesh members 30 and the other adhesive surface 60b covered with a removable film 65, as illustrated in FIG. 7.

Figure 5:
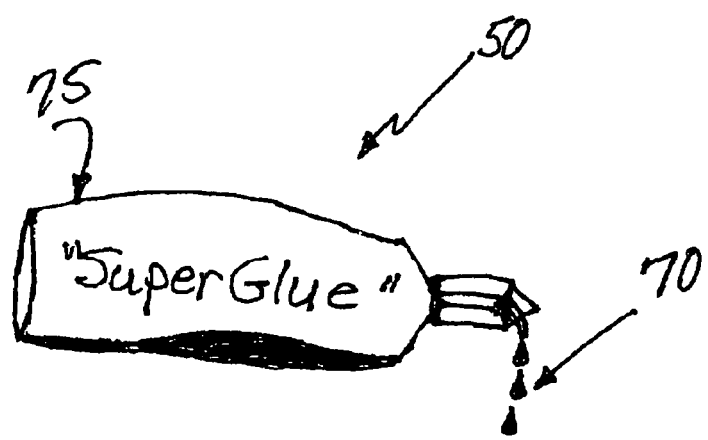
FIG. 5 is a perspective view of another embodiment of the adhesive material of the hood scoop decoration kit of the present invention.

In another embodiment of the hood scoop decoration kit 10 invention, the adhesive material 50 comprises a contained fluid adhesive 70 adapted for application to the concave side of the of the bezel trim member 20. Such a contained fluid adhesive 70 is illustrated in FIG. 5. For example, the contained fluid adhesive 70 can include a fast-setting vinyl polymer, commonly termed "super glue." This particular fluid adhesive material 50 is contained in an airtight tube 75 and dispensed onto the concave side of the bezel trim member 20 just prior to placement of the bezel trim member 20 on the selected mounting surface of the hood scoop H. The cured adhesive material 50 secures the bezel trim member 20 to the selected mounting surface of the hood scoop H. Such a contained fluid adhesive 70 can be used to secure the planar mesh member 30 to the forward facing end of a hood scoop H.

Figure 8:
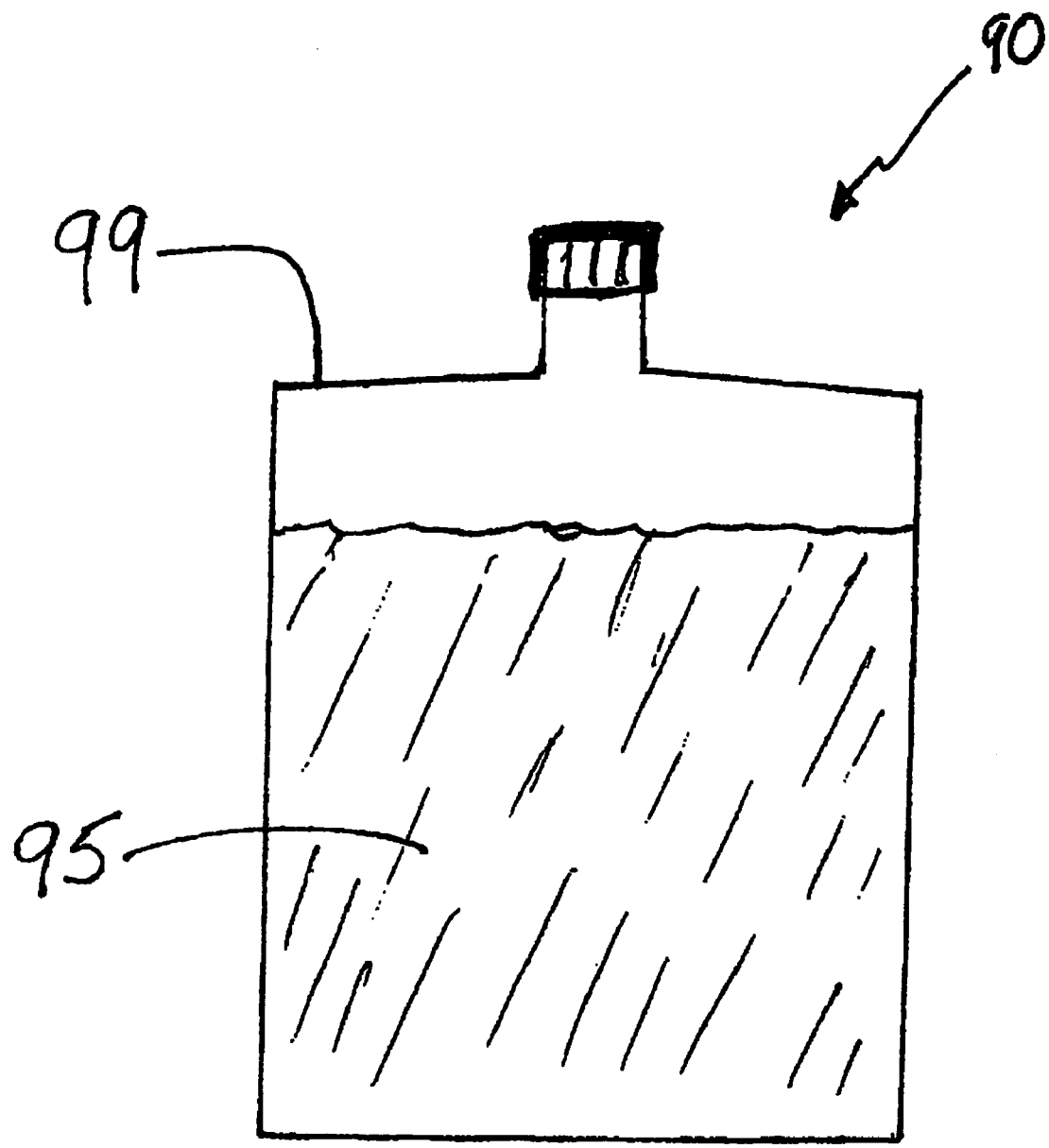
FIG. 8 is a perspective view of the cleaning fluid of the hood scoop decoration kit of the present invention.

In a further embodiment of the invention, the hood scoop decoration kit 10 invention includes a cleaning material 90 adapted for preparing the mounting surfaces of the hood scoop H for attachment of the bezel trim member 20 and planar mesh member 30 thereto by means of the adhesive material 50. For example, the cleaning material 90 can be a contained cleaning fluid 95, such as an alcohol, a hydrocarbon solvent or a chlorinated solvent, contained in a fluid-tight vessel 99 for such use, as illustrated in FIG. 8.

While the invention has been particularly shown and described with reference to preferred embodiments thereof, it will be understood by those skilled in the art that various changes in form and details may be made therein without departing from the spirit and scope of the invention.

I claim:

1. A hood scoop decoration kit comprising:
   a bezel trim member having a concave shape with first and second ends extending in a common direction from a center section thereof, the bezel trim member adapted for attachment to an exterior surface of a hood scoop adjacent a forward facing end thereof;
   a planar mesh member having a trapezoidal shape, the mesh member adapted for attachment to a forward facing end of a hood scoop; and
   an attachment device for securing the bezel trim member and the planar mesh member to the hood scoop.

2. The hood scoop decoration kit of claim 1, wherein the bezel trim member and the planar mesh member are fabricated from a material selected from the group consisting of a metallic material and a polymeric resin material.

3. The hood scoop decoration kit of claim 1, wherein bezel trim member is fabricated from a material selected from the group consisting of a ferrous alloy and aluminum.

4. The hood scoop decoration kit of claim 1, wherein the bezel trim member is a metallic material and chrome plated.

5. The hood scoop decoration kit of claim 1, wherein the attachment device is an adhesive material.

6. The hood scoop decoration kit of claim 5, wherein the adhesive material is a contained fluid adhesive adapted for application to an interior surface of the concave bezel trim member and to an edge of the planar mesh member.

7. The hood scoop decoration kit of claim 1, wherein the adhesive material is a tape having opposed adhesive sides.

8. The hood scoop decoration kit of claim 7, wherein one adhesive side of the tape is adhered to an interior surface of the concave bezel trim member and the opposed adhesive side of the tape is covered with a removable film.

9. The hood scoop decoration kit of claim 1, further including a cleaning material adapted for preparing the hood scoop surface for attachment of the bezel trim member and mesh member thereto.

10. A hood scoop decoration kit comprising:
a bezel trim member having a concave shape with first and second ends extending in a common direction from a center section thereof, the bezel trim member adapted for attachment to an exterior surface of a hood scoop adjacent a forward facing end thereof;
a planar mesh member having a trapezoidal shape, the mesh member adapted for attachment to a forward facing end of a hood scoop;
an attachment device for securing the bezel trim member and the planar mesh member to the hood scoop; and
a cleaning material adapted for preparing the hood scoop surface for attachment of the bezel trim member and mesh member thereto.

11. The hood scoop decoration kit of claim 10, wherein the bezel trim member and the planar mesh member are fabricated from a material selected from the group consisting of a metallic material and a polymeric resin material.

12. The hood scoop decoration kit of claim 10, wherein bezel trim member is fabricated from a material selected from the group consisting of a ferrous alloy and aluminum.

13. The hood scoop decoration kit of claim 10, wherein the bezel trim member is a metallic material and chrome plated.

14. The hood scoop decoration kit of claim 10, wherein the attachment device is an adhesive material.

15. The hood scoop decoration kit of claim 14, wherein the adhesive material is a contained fluid adhesive adapted for application to an interior surface of the concave bezel trim member and to an edge of the planar mesh member.

16. The hood scoop decoration kit of claim 14, wherein the adhesive material is a tape having opposed adhesive sides.

17. The hood scoop decoration kit of claim 16, wherein one adhesive side of the tape is adhered to an interior surface of the concave bezel trim member and the opposed adhesive side of the tape is covered with a removable film.

18. A hood scoop decoration kit comprising:
a bezel trim member having a concave shape with first and second ends extending in a common direction from a center section thereof, the bezel trim member adapted for attachment to an exterior surface of a hood scoop adjacent a forward facing end thereof;
a planar mesh member having a trapezoidal shape, the mesh member adapted for attachment to a forward facing end of a hood scoop;
an attachment adhesive material for securing the bezel trim member and the planar mesh member to the hood scoop; and
a cleaning material adapted for preparing the hood scoop surface for attachment of the bezel trim member and mesh member thereto.

19. The hood scoop decoration kit of claim 18, wherein the adhesive material is a contained fluid adhesive adapted for application to an interior surface of the concave bezel trim member and to an edge of the planar mesh member.

20. The hood scoop decoration kit of claim 18, wherein the adhesive material is a tape having opposed adhesive sides.

* * * * *